Figure 1:
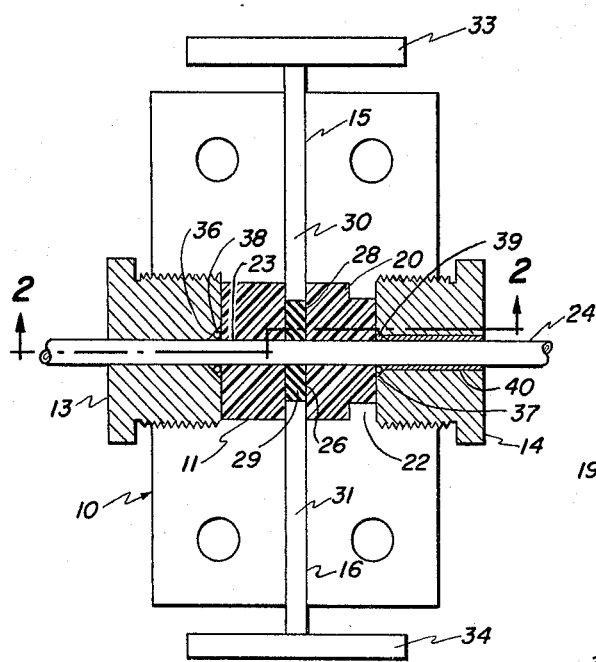

Dec. 6, 1966   J. A. CHOPP   3,290,477

WELDING MEANS AND METHOD

Filed July 19, 1963   2 Sheets-Sheet 1

INVENTOR.
John A. Chopp
BY
Roland G. Anderson
Attorney

INVENTOR.
John A. Chopp ized Dec. 6, 1966

3,290,477
WELDING MEANS AND METHOD
John A. Chopp, Denver, Colo., assignor to the United States of America as represented by the United States Atomic Energy Commission
Filed July 19, 1963, Ser. No. 296,409
6 Claims. (Cl. 219—78)

The present invention relates generally to welding, and more particularly to tube sealing wherein stress is applied to the tube through the intermediation of deformable insulating means while an electrical current is being passed through the tube for heating the latter.

Tubes were previously sealed by utilizing a resistance welding procedure which involved the application of an electrical current to the tube through electrodes such that the electrical path was formed laterally across the tube. These electrodes also applied the squeezing pressure to the tube. This procedure was not entirely satisfactory because of the difficulty of obtaining good reproducibility in tube sealing. This difficulty was primarily due to the incapability of providing adequate controls over the electrical heating currents and pressures being applied to the tube and in utilizing the rigid electrodes for deforming the tube. Also with the prior art devices it was difficult to seal a tube containing a highly pressurized fluid.

The present invention aims to overcome the above and other difficulties or disadvantages by providing new and improved means for sealing tubes through the use of an elastic material to squeeze the tube while simultaneously applying an electrical current generally lengthwise along the tube, and by minimizing movement of the tube during the sealing of the tube.

An object of the present invention is to provide a new and improved means of relatively simple and inexpensive construction for sealing fluid conveying tubes.

Another object of the present invention is to provide a new and improved means for sealing tubes containing fluid whether or not the fluid is pressurized.

Another object of the present invention is to utilize an elastic insulating material for squeezing the tube wherein the elastic material functions as a mold after the tube attains a somewhat plastic state and with the elastic material supplying sufficient pressure to restrain internal fluid pressure within the tube.

A further object of the invention is to apply an essentially constant electrical current through a portion of the tube length for obtaining desirable welding temperatures at the location of the tube being reduced in cross-sectional area by externally applied pressure.

A still further object is to provide tube retaining means for minimizing tube movement during the welding of the tube.

Other and further objects of the invention will be obvious upon an understanding of the illustrative embodiment about to be described, or will be indicated in the appended claims, and various advantages not referred to herein will occur to one skilled in the art upon employment of the invention in practice.

A preferred embodiment of the invention has been chosen for purposes of illustration and description. The preferred embodiment illustrated is not intended to be exhausted nor to limit the invention to the precise form disclosed. It is chosen and described in order to best explain the principles of the invention and their application in practical use to thereby enable otrers skilled in the art to best utilize the invention in various embodiments and modifications as are best adapted to the particular use contemplated.

Figure 3:
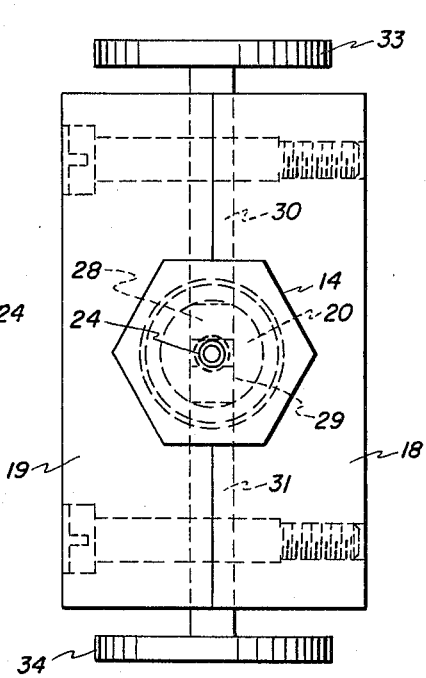
Figure 2:
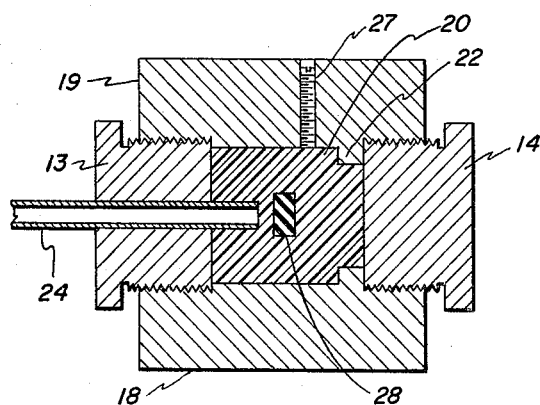
Figure 5:
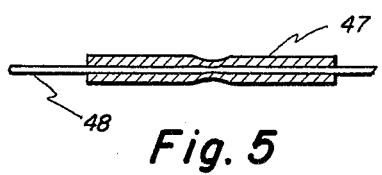
Figure 4:
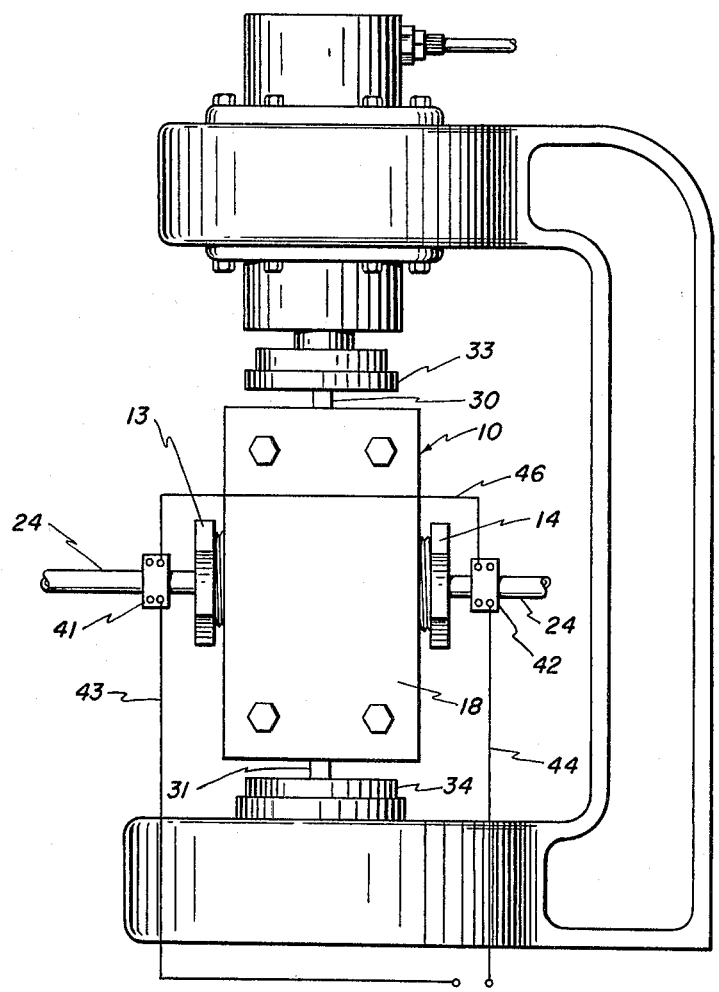

In the accompanying drawings:
FIG. 1 is a frontal elevational sectional view illustrating the tube sealing fixture of the present invention;
FIG. 2 is a sectional view taken generally along lines 2—2 of FIG. 1;
FIG. 3 is an elevational side view of the present invention;
FIG. 4 is a view showing the fixture of present invention operatively positioned in a pressure providing mechanism; and
FIG. 5 is a view showing a bushing welded to a wire by utilizing the welding fixture of the present invention.

Referring to FIGS. 1–3, the tube sealing device or fixture of the present invention is shown comprising a metal rectangularly shaped die body 10 containing a centrally disposed welding chamber 11 of a generally cylindrical configuration that extends through the width of the die body 10. The die body 10 may be provided with threaded surfaces at opposite ends of the welding chamber 11 for threadedly receiving tube retaining screws 13 and 14 therein, as will be hereinafter described. A pair of passages 15 and 16 are shown transversely intersecting the welding chamber 11 from opposite sides and intermediate the ends thereof in such a manner that the passages 15 and 16 are in alignment with each other and provide communication between the welding chamber and opposite ends of the die body 10. Each of these passages may be of a generally rectangular configuration for reception of a movable piston therein that may be of a similar configuration. The die body 10 may be made up from a pair of metal plates 18 and 19 (FIGS. 2 and 3) separable from each other so that each plate contains in the surface thereof one-half the configuration of each passage and the welding chamber. These plates may be held together by any suitable means such as the bolting arrangement shown. Of course, if desired, the die body may be cast as an integral unit or formed in any other suitable manner.

In order for the welding chamber 11 to provide a suitable tube supporting arrangement for facilitating proper welding of the tube, it may be provided with a centrally disposed insulating body 20 of a cylindrical configuration similar to that of the welding chamber 11 and may be of such a diameter that it requires a light press-fit to position it within the welding chamber 11. The insulating body 20 may extend lengthwise within the welding chamber so that its ends are essentially adjacent to the innermost ends of the threaded surfaces. Means for retaining the insulating body in this position may be of any suitable type, such as, for example, an annular shoulder 22 shown extending from the die body 10 into the chamber 11 where it engages a groove in the surface of the insulating body 20. While the insulating body 20 may be of any relatively rigid electrical insulating material which can withstand the heat and pressure encountered during the welding of the tube, satisfactory results have been attained by uisng Synthane (generally a cotton or linen fabric reinforced by a plastic material such as phenolic resin) manufactured by and commercially available from the Synthane Corporation, Oaks, Pennsylvania.

The insulating body 20 may be provided with a bore 23 which is coextensive with the length thereof and of a diameter closely approximating the outer diameter of the tube to be welded. For example, if the tube shown at 24 has an outer diameter of one-eighth inch (.125), then the diameter of the bore 23 could be about $$.124 \begin{array}{l} +.005 \\ -.000 \end{array}$$

thus providing a close fit about the tube for maintaining it in a desirable welding position. A second bore 26, which is preferably disposed transversely to the axis of the bore 23, may be formed in the insulating body 20 so that it passes through the width thereof and intersects the bore 23. This bore 26 may be of a generally rectangular configuration and of a dimension similar to that of the passages 15 and 16. For example, the dimensions of the passages 15 and 16 and the bore 26, when welding one-eighth inch tubing, may be in the order of one-eighth inch by one-fourth-inch and so oriented that the one-fourth inch dimension lies across the tube 24. To maintain the insulating body 20 in position within the welding chamber so that the bore 26 is in alignment with passages 15 and 16, a set screw 27 or the like (FIG. 2) may be passed through the die body 10 to bear against the surface of the insulating body 20, or in other instances it may be preferable to cement the insulating body 20 in place.

A purpose of bore 26 is to position a pair of deformable piston heads 28 and 29, one on each side of the bore 23, that are of rectangular configurations having dimensions similar to the bore 26 such that they contact the walls of the bore 26 and yet are movable with respect thereto. These piston heads may each be about one-half inch in length so as to provide a suitable deformable mass for squeezing the tube as will be hereinafter described. The material used for the piston heads 28 and 29 should be such that it remains workable for performing its intended function at high temperatures and pressures. For example, one such material found suitable is silicone rubber of high heat resistance properties. This type material was found desirable because of its high temperature characterstics and its ability to function somewhat in the manner of a hydraulic fluid under pressure for enabling it to function as a mold after the tube attains a suitable plastic state.

In order to move the piston heads 28 and 29 against the surface of the tube 24 to squeeze the latter, a pair of pistons 30 and 31 may be inserted into the passages 15 and 16 respectively, so that they each engage one end of a particular piston head and extend to a location externally of the die body 10. Suitable discoid-like flanges 33 and 34 may be attached to or be formed integrally with the outermost ends of the pistons 30 and 31 respectively, for providing surfaces against which force may be applied to move the pistons towards each other and effect the squeezing of the tube 24. The pistons may be of a rectangular configuration similar in size to the piston heads so that essentially the entire surface area at one end of each piston head is engaged by a piston, thus minimizing deformation of the piston heads within the bore 26.

While the tube sealing fixture is preferably provided with two passages intersecting the bore 26 from opposite sides thereof, it will appear clear that in some instances only one such passage may intersect the bore 26 such that only one piston head combination may be utilized for squeezing the tube.

To facilitate the making of leak-tight tube closures, the tube should not be allowed to move freely along its longitudinal axis (as shown) during the welding. To minimize this tube movement a pair of tube retaining screws 13 and 14 may be used. These screws 13 and 14 may each be provided with a centrally disposed penetrating passage of a diameter slightly greater than the diameter of the tube 24 and include chamfers 36 and 37 respectively, in the innermost ends of the screws such that each chamfer is disposed about the edge of the passage through the particular screw. Within these chamfers 36 and 37 suitable deformable masses such as O-rings 38 and 39 respectively, may be positioned so that as each of the retaining screws is turned inwardly to or towards an abutting relationship with an end of the insulating body, the O-ring 38 or 39 positioned therebetween becomes sufficiently compressed and deformed so as to bear against the surface of the tube, binding it, and thereby substantially restraining it from movement. While the tube movement does not have to be accurately regulated, the restraining force which inhibits this movement may be such that at the time of melting, separation of the tube takes place at a reasonable rate. In some instances it is possible to restrain completely the movement of the tube since closure will take place without separation. Also, if the tube is restrained on one side only, sealing of that portion of the tube will take place while the non-restrained portion of the tube will separate but possibly will not be sealed.

While the tube sealing device is shown with two retaining screws, it will appear clear that, if desired, only one such screw may be used to hold the tube on only one side of the welding chamber. Preferably retaining screw 13 would be retained in a tube sealing device using a single retaining screw so that the annular shoulder 22 is capable of providing a positioning abutment for the insulating body 20 as the screw 13 is turned inwardly into position. Also, if desired, a suitable mechanism such as a restraining horseshoe member or the like (not shown) with means for engaging the tube 24 on opposite sides of the die body 10 and thereby restraining movement of the tube, may be used along with the retaining screw arrangement to aid in minimizing the speed of tube movement.

While the die body 10, the pistons and piston heads, and their respective bores or passages are described as being of rectangular configurations, it will appear clear that they may be of any desired shape, such as, for example, cylindrical.

In welding closed a tubular conduit, such as, for example, a one-eighth inch outer diameter tube of 5456 or 5052 aluminium alloy, a typical operational welding sequence might be carried out in the following manner.

As shown in FIG. 4, the fixture of the present invention is positioned in a hydraulic press so that pressure may be applied against the piston flanges 33 and 34 for moving the piston heads 28 and 29 towards each other to squeeze the tube 24. The press may be of any known type capable of exerting from about 200 to 500 pounds force against the pistons 30 and 31. A suitable tube closure may be attained by a press that decreases the force being applied against the pistons as the latter are displaced. Ordinarily, this decrease in force is attained by using a conventional hydraulic system without accumulators, thus enabling the use of a relatively inexpensive hydraulic press with the present invention.

Prior to placing the tube sealing fixture in the press, or at any other suitable time, the tube 24 to be sealed is passed through the retaining screws 13 and 14 and the insulating body 20 until the point at which the tube is to be sealed is positioned between the piston heads 28 and 29. The retaining screws 13 and 14 may then be turned inwardly to deform the O-rings 38 and 39 and restrain the tube from moving. When using two retaining screws, it may be preferable to place a bushing 40 of a suitable insulating material between one of the screws and the tube 24, thus preventing the establishment of an electrical path through the die body 10 instead of through the tube, as will be hereinafter brought out.

Upon securing the tube within the welding fixture in its desired position, junction blocks 41 and 42 may be attached to the tube on opposite sides of the welding fixture so as to facilitate the passing of an electrical current between the junction blocks via the tube 24. These junction blocks may be of any suitable configuration, such as, for example, the junction blocks may comprise split, grooved blocks of copper that are place over the tube and secured by machine screws or the like. A pair of electrical leads 43 and 44 extending from a power source (not shown) may be attached to the junction blocks 41 and 42 respectively, in any suitable manner such as by one of the machine screws or by welding, soldering, etc. The power source should be capable of supplying an electrical current in the order of about 280 amps. for a tube of the size and material noted. While a constant current is preferred, variations in current of about ±50 amps. during the welding process are acceptable. Application of a constant current value within this range allows control of the operation through the variation of the distribution of current between the weld and a shunt arrangement as will be hereinafter described.

To effect the closure or sealing of the tube 24, the power source may be electrically coupled to the junction blocks substantially simultaneously with the application of pressure upon the pistons 30 and 31. In order to prevent arcing within the fixture that may occur between the tube ends upon parting, a suitable shunt arrangement such as schematically indicated at 46 (FIG. 4) is preferably used. This shunt arrangement may also be used to supply an electrical signal to a control circuit (not shown) for indicating the parting of the tube and for shutting off the power source.

As the current is passing lengthwise through the tube, the lateral stressing of the tube by the pistons does work on the tube so as to heat it and raise the temperature sufficiently at that location as to thereby bring about localized resistance to the current flow, and thus attaining the desired temperature rise and tube melting. When the tube is heated sufficiently to reach a plastic state the portion of the tube being worked or stressed by the pistons is decreased in cross-sectional area. This decrease in the cross-sectional area of the tube section being squeezed causes the electrical resistance through this section to increase, thereby facilitating further heating of it until the metal tube at the squeezed location becomes substantially plastic. The piston heads 28 and 29 during this latter stage of heating deform sufficiently so as to function as a mold and form the portion of the tube being sealed into a desirable configuration. Inasmuch as the longer surface portions, i.e., the one-fourth inch dimensions, of the piston heads lie transversely to the longitudinal axis of or across the tube 24 adjacent the points of contact therebetween, the piston heads tend to deform about the entire circumference of the tube and thereby essentially uniformly squeezing this entire portion of the tube so as to shape the end being sealed into somewhat of a round, pointed configuration. Normally, for a tube of the noted size and material, the specified currents and pressures are applied for the duration of about one minute. Of course, if the pressure or the current varies, the time required for welding the tube may be more or less than one minute.

A unique control feature afforded by the welding arrangement of the present invention is that by passing the current lengthwise through the tube 24, the current and the force which is applied to the tube by the elastic pistons, may be varied over wide ranges and still produce desirable welds. This feature is achieved through the "self-compensating" properties of the novel welding process in that if the current passing lengthwise through the tube is less or if the force is less, the time of application will be longer. Conversely, if the current or force is greater then the time of application will be shorter.

While the above description of the tube welding relates more particularly to an aluminum alloy tube having a one-eighth inch diameter, it will appear clear that tubes of other materials and sizes may be sealed in the present fixture, of course, bearing in mind that the noted dimensions of the fixture components, the current, the type elastic material, and the pressure may not necessarily be applicable for tubes of other materials or sizes.

The present arrangement may be used for other welding applications, such as, for example, the welding of a bushing onto a wire as shown in FIG. 5. The bushing 47 and wire 48 are each heated by an electrical current passing lengthwise therethrough while the bushing is being essentially concurrently subjected to the piston-provided stress in much the same manner as the tube 24, thus causing the bushing to be squeezed against the wire 48 and be welded thereto. The bushing and wire may be of any suitable metals capable of being welded together; for example the bushing may be silver while the wire may be copper.

It will be seen that the present invention sets forth a unique arrangement for closing or sealing fluid conveying conduits so as to make them completely leak-tight. The welding procedure produces a tube closure which has essentially the same grain structure as the parent metal in the tube. The tube may also contain an internal pressure of about 500 p.s.i. and be sealed without any loss of pressure or fluid.

As various changes may be made in the form, construction and arrangement of the parts herein without departing from the spirit and scope of the invention and without sacrificing any of its advantages, it is to be understood that all matter herein is to be interpreted as illustrative and not in a limiting sense.

I claim:

1. A device for welding together a portion of the walls of a generally elongated tubular metal article to provide at said portion sealed closure of said article comprising in combination, a housing having a welding chamber therein, insulating means disposed within the chamber and penetrated by said tubular article, selectively actuable means for engaging said article to restrain movement thereof, means for passing an electrical current generally lengthwise through said tubular article and portion for heating said portion, and resiliently deformable means interposed within the insulating means for stressing said portion to squeeze together and deform said portion of the tube during the heating thereof to effect said sealed closure.

2. The device of claim 1 in which the insulating means includes a first passage for the penetration of the portion of said tubular article and a second passage transversely intersecting said first passage and the resiliently deformable stressing means is received in said second passage.

3. The device claimed in claim 2 wherein said selectively actuable means comprises at least one retaining screw threadedly engageable with said housing and includes a deformable member disposed between one end of said screw and said insulating means for binding against a surface of said article upon being deformed between the screw and the insulating means.

4. The device claimed in claim 2 wherein said housing has a bore therethrough intersecting said welding chamber at a location in alignment with said second passage, and piston means comprising a pair of pistons are disposed in said bore with one of said pistons on each side of said chamber and extending to locations externally of said housing.

5. The device claimed in claim 4 wherein said insulating means comprises a substantially rigid material capable of being subjected to relatively high temperatures, and wherein said deformable means comprises an insulating material deformable under pressure for facilitating the shaping of the article.

6. The method of sealing a tubular metal conduit which comprises the steps of insulatively enveloping a length of said conduit, restraining longitudinal movement of said length, applying stress to a portion of the conduit length for effecting a decrease in the cross sectional area of said conduit at said portion, passing an electrical current through said conduit length for resistance heating of said portion, said stress and said electrical current being applied to said conduit substantially simultaneously, pressure molding said conduit portion into a preselected configuration during the application of said stress and said electrical current, the temperature of said portion increasing as it decreases in cross sectional area for effecting the sealing of said conduit at said conduit portion.

References Cited by the Examiner

UNITED STATES PATENTS

| | | | |
|---|---|---|---|
| Re: 14,798 | 2/1920 | Edison | 219—154 |
| 528,661 | 11/1894 | Engel | 219—149 |
| 953,041 | 3/1910 | Lachman | 219—50 |
| 1,023,316 | 4/1912 | Hurwitz | 219—149 |
| 1,907,907 | 5/1933 | Varney | 219—68 |
| 2,132,071 | 10/1938 | Johnson | 219—117 |
| 2,195,775 | 4/1940 | Gaspar | 219—149 |
| 2,554,328 | 5/1951 | Grimes | 219—149 X |
| 2,851,580 | 9/1958 | Taylor | 219—68 |

RICHARD M. WOOD, *Primary Examiner.*

B. A. STEIN, *Examiner.*